(12) United States Patent
Deibel

(10) Patent No.: US 6,422,358 B2
(45) Date of Patent: Jul. 23, 2002

(54) VENTILATED DISC BRAKE ROTOR

(76) Inventor: William T. Deibel, 6426 NE. Windermere Rd., Seattle, WA (US) 98105

( * ) Notice: Subject to any disclaimer, the term of this patent is extended or adjusted under 35 U.S.C. 154(b) by 0 days.

(21) Appl. No.: 09/767,660

(22) Filed: Jan. 22, 2001

Related U.S. Application Data

(60) Provisional application No. 60/178,048, filed on Jan. 24, 2000.

(51) Int. Cl.$^7$ .............................................. F16D 65/10
(52) U.S. Cl. ......................... 188/218 XL; 188/264 AA
(58) Field of Search ...................... 188/218 XL, 264 A, 188/264 AA, 18 A

(56) References Cited

U.S. PATENT DOCUMENTS

| | | | |
|---|---|---|---|
| 984,253 A | 2/1911 | Adriance et al. | |
| 2,242,855 A | 5/1941 | Flowers | |
| 2,584,190 A | 2/1952 | Danly et al. | |
| 3,724,614 A | * 4/1973 | Bender | 188/218 XL |
| 3,809,192 A | * 5/1974 | Stehle | 188/264 A |
| 5,429,214 A | 7/1995 | Wiebelhaus et al. | |
| 5,878,479 A | 3/1999 | Dickerson et al. | |
| 6,148,964 A | * 11/2000 | Huang | 188/218 XL |
| 6,216,828 B1 | * 4/2001 | Burger | 188/218 XL |

* cited by examiner

Primary Examiner—Matthew C. Graham
(74) Attorney, Agent, or Firm—Christensen O'Connor Johnson Kindness PLLC

(57) ABSTRACT

The invention is directed to a ventilated brake rotor, including a hub mounting face, a rotor ring having two faces, and a hub wall connecting the hub mounting face to the rotor ring. The rotor ring has alternately faced conical passages disposed at an angle less than 90 degrees to the face of the rotor ring. Each passage passes through both the first and second face of the rotor ring, and when the ventilated brake rotor is rotated each passage acts as a conduit for air flow through the rotor ring.

5 Claims, 2 Drawing Sheets

VENTILATED DISC BRAKE ROTOR

FIELD OF THE INVENTION

This application claims the benefit of U.S. Provisional patent application No. 60/178,048, filed Jan. 24, 2000.

This invention pertains to caliper type disc brakes for wheeled vehicles, more particularly brakes of a size and style as used on heavier passenger cars, as well as trucks and other commercial vehicles of all weight categories, where the added cost of rotor ventilation is justified for cooling purposes.

BACKGROUND OF THE INVENTION

Typically disc brake rotors for these applications have been made from iron castings which, through the use of foundry cores, have a plurality of usually tapered, radial air passages between the friction surfaces which act as a centrifugal fan when the rotor turns drawing air from around the axle on the side opposite the wheel and discharging this air in a radial direction from around the circumference of the rotor.

Additionally, some high performance solid disc brake rotors such as used on motorcycles and light four wheel vehicles achieve a reduction in the build-up of wear debris on the caliper friction pads with holes in the rotor surfaces or in some cases just dimples in the friction surfaces—neither of which actually pump cooling air.

SUMMARY OF THE INVENTION

The invention is directed to a ventilated brake rotor, including a hub mounting face, a rotor ring having two faces, and a hub wall connecting the hub mounting face to the rotor ring. The rotor ring has alternately faced passages disposed at an angle less than 90 degrees to the face of the rotor ring. Each passage passes through both the first and second face of the rotor ring.

Preferably, the passage outlet openings are radially farther from the rotor axis than the inlet openings, hence these passages will act like a fan due to centrifugal force to move air through the rotor mass for cooling when the ventilated brake rotor is rotated. A variation of the instant design would be one where the passages alternate directions such that half the inlets and half the outlets occur on each rotor surface.

Purposes and advantages of the novel design disclosed herein, in no particular order, are as follows:

1. Greater heat transfer from the rotor to the atmosphere due to the greater cooling air flow that will result from the larger less restrictive passages.

2. More uniform rotor cooling since both friction surfaces are benefited equally as a result of half the cooling air being drawn from the traditionally dead space between the rotor and the wheel. While with prior art rotors, the friction surface facing the wheel will run hotter than the friction surface facing away from the wheel, since the surface away for the wheel is exposed to the slip stream in the open atmosphere.

3. Less heat transfer to the tires from the brake rotor due to more uniform rotor cooling, again for the same reason as in 2.

4. Better cooling of the caliper friction pads as a result of their being swept and fanned as the openings pass them by.

5. Less heat transfer to the caliper friction pads from the brake rotor due to better rotor cooling, again for the same reason as in 2.

6. Improved braking due to the reduction in the build-up of wear debris on the caliper friction pads resulting from the passages sweeping and fanning the caliper friction pads per 4 above.

7. Reduced manufacturing cost due to the simplified foundry coring and core removal.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 2:
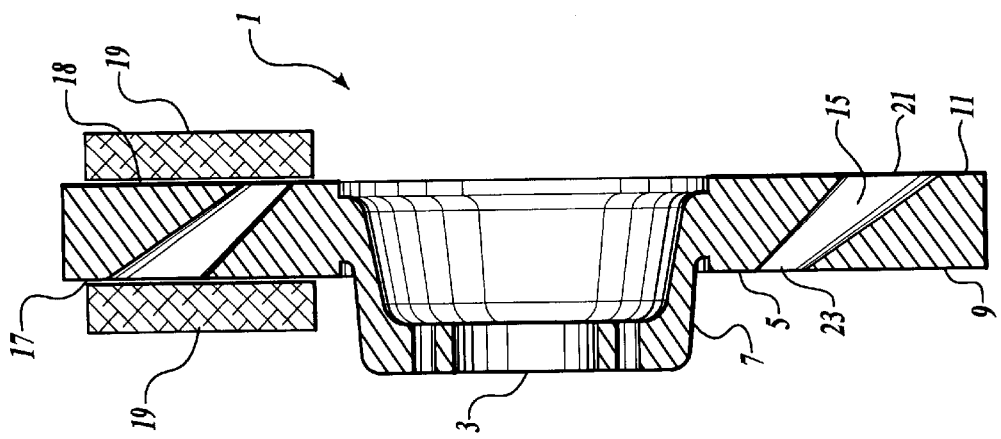
FIG. 2 is a diametric cross-section of the rotor showing the location of friction pads relative to the rotor.
Figure 1:
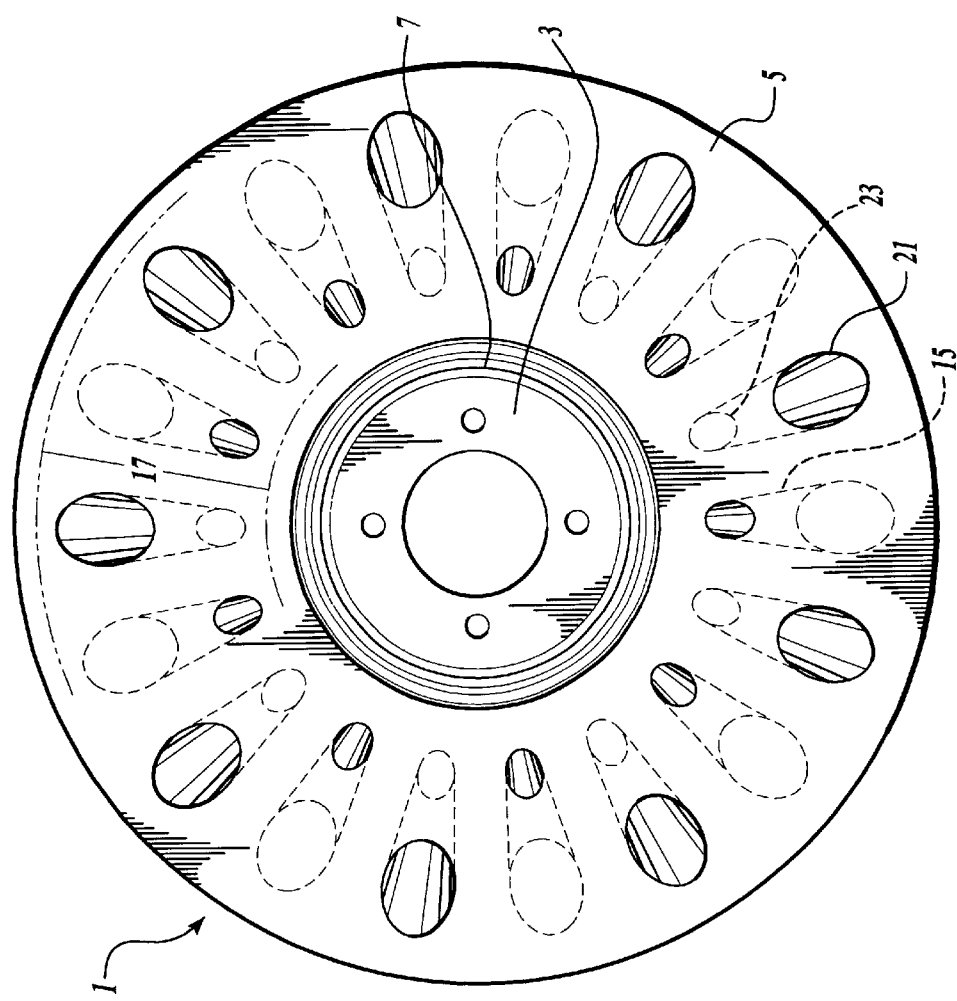
FIG. 1 is an elevation view of a rotor according to the present invention.

Referring first to FIGS. 1 and 2, ventilated brake rotor 1 comprises a hub mounting face 3, a rotor ring 5 having a first and second face 9 and 11 respectively, and a hub wall 7 connecting the hub mounting face 3 to the rotor ring 5. The rotor ring 5 has passages 15 for air having first and second openings 21 and 23 respectively, wherein each passage 15 passes through both the first and second faces 9 and 11 of the rotor ring 5. The passages 15 may be disposed at any angle to the face of the rotor ring. While the brake rotor 1 is spinning, the passages 15 act to cool the brake rotor 1 by pumping air through the passages.

When the brake rotor 1 of the present invention is used as part of a brake mechanism, caliper friction pads 19 can engage the first and second faces 9 and 11. Frictional surfaces 17 and 18 are defined where the pads 19 may engage the faces 9 and 11 of rotor ring 5.

In this embodiment, the ventilation passages 15 may pass through the rotor ring 5 from face to face at an angle to the parallel faces 9 and 11, and may be skewed relative to a radius of the brake rotor 1, for example, as the spokes are in a bicycle wheel. As used herein, the angle of the passage 15 to the parallel faces 9 and 11 is defined by an imaginary line through the centers of openings 21 and 23. The outlet openings 21 are preferably radially farther from the rotor axis than the inlet openings 23, hence the passages 15 will act like a fan due to centrifugal pumping action that moves air through the brake rotor 1 as it rotates for cooling of the rotor mass. Without being bound to a particular theory, it is believed that passages 15 pass air by centrifugally pumping air from openings 23 closer to the brake rotor 1 axis and pumping this air to openings 21 farther from the brake rotor axis.

Figure 3:
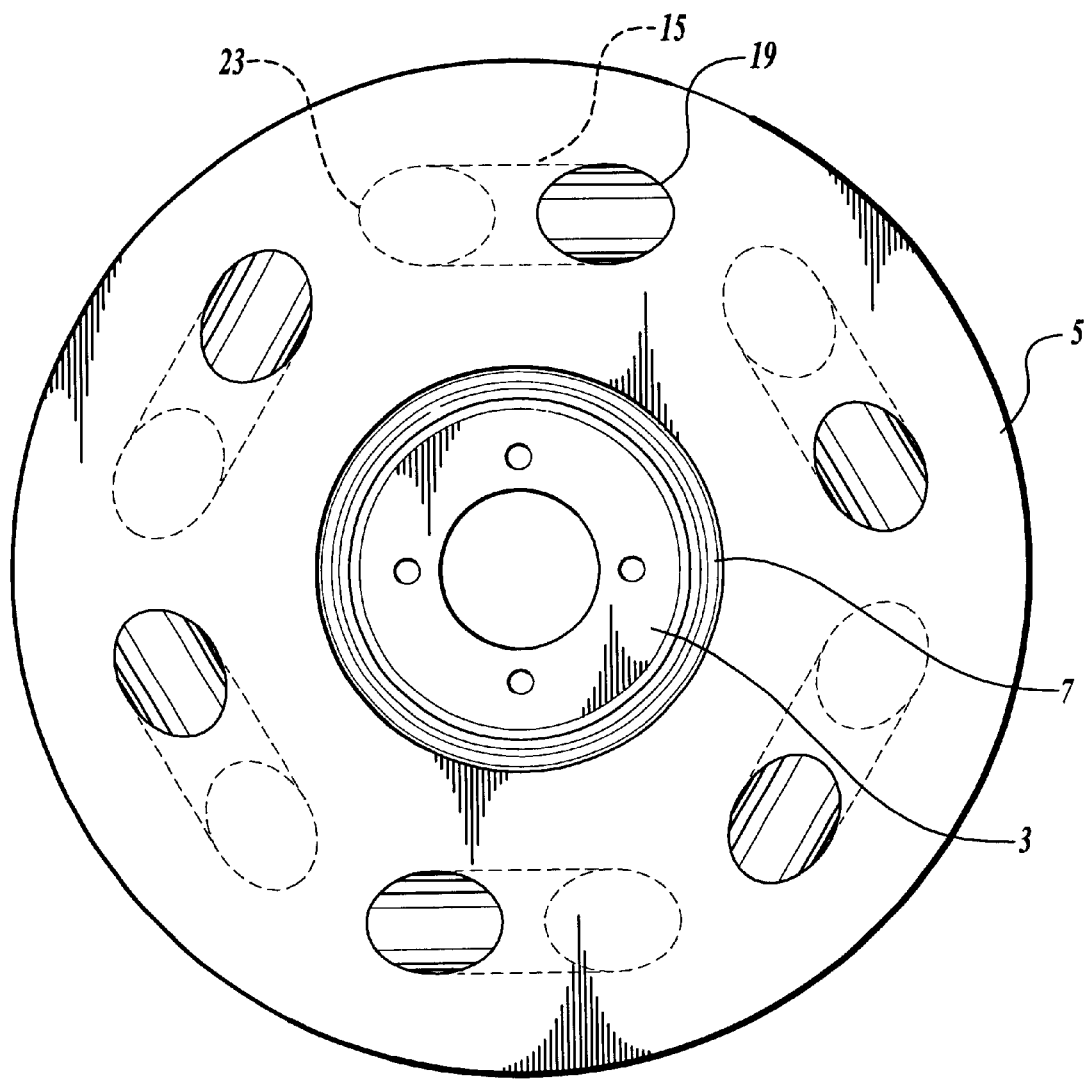
FIG. 3 is an elevation view of an alternative embodiment of a rotor according to the present invention.

Referring first to FIG. 3, the passages 15 may even be positioned tangential to the curvature of the rotor 1, so that while openings 21 and 23 for a select passage 15 may be equidistant from the brake rotor 1 axis, passage 15 is still at an angle to parallel faces 9 and 11. Without being bound to a particular theory, it is believed that passages 15 tangential to the curvature of the rotor 1 act to draw air in the openings facing the direction of rotation, thereby forcing air through the openings facing away form the direction of rotation.

In the preferred embodiment, the brake rotor 1 is ventilated with a plurality of passages 15 cast in the rotor ring 5 such that they open at each end into opposite friction surfaces 17 and 18. Thus, the first opening 21 of a first passage 15 opens to the first rotor face 9, while the first opening 21 of a second passage 15 opens to the second rotor face 11. The passages 15 may be evenly spaced around the entire rotor ring 5. Alternatively, passages 15 may open in any other pattern including all passages opening in a uniform direction or in a random pattern.

In the most preferred embodiment the passages 15 have a conical cross section. As used herein the term conical means that where there is a passage in the rotor ring the passage has a truncated conical or truncated pyramidal cross section. Thus, the term conical means that one end of the passage is smaller than the opposing end. As illustrated, it is preferred that the opening 21, farther from the brake rotor 1 axis, be larger than the opening 23 of a given passage 15. Alternatively, passages 15 may be of any shape, including skewed cylindrical as shown in FIG. 3.

Finally, the friction pads 19 at least partially pass over a passage opening 21 and/or 23. This improves braking due to the reduction in the build-up of wear debris on the caliper friction pads 19 by the openings 21 and/or 23 of the passages 15 sweeping the caliper friction pads. This also improves braking due to cooling of the caliper friction pads 19 as a result of their being fanned as the openings 21 and/or 23 pass them by. Alternatively, brake rotor 1 may be formed so that the friction pads 19 do not pass over any passage opening 21 or 23.

While the preferred embodiment of the invention has been illustrated and described, it will be appreciated that various changes can be made therein without departing from the spirit and scope of the invention.

What is claimed is:

1. A ventilated brake rotor, comprising:
   (a) a hub mounting face;
   (b) a rotor ring having a first and second face;
   (c) a hub wall connecting the hub mounting face to the rotor ring;
   (d) wherein the rotor ring has passages for air having first and second openings;
   (e) wherein each passage passes from the first to the second face of the rotor ring;
   (f) wherein the passages are disposed at an angle less than 90 degrees to the face of the rotor ring;
   (g) wherein the air passages are oriented in alternating directions in the rotor ring, wherein a first passage has a first opening in the first face of the rotor ring and a second passage adjacent to the first passage has a corresponding first opening in the second face of the rotor ring; and
   (h) wherein the first openings are positioned farther from the axis of said ventilated brake rotor than the second openings.

2. The ventilated brake rotor of claim 1 wherein friction pads engaging the rotor ring at least partially pass over a passage opening.

3. The ventilated brake rotor of claim 1 wherein each passage has a conical shape.

4. A ventilated brake rotor, comprising:
   (a) a hub mounting face;
   (b) a rotor ring having a first and second face;
   (c) a hub wall connecting the hub mounting face to the rotor ring;
   (d) wherein the rotor ring has passages for air having first and second openings;
   (e) wherein each passage passes from the first to the second face of said rotor ring;
   (f) wherein said passages are disposed at an angle less than 90 degrees to the face of said rotor ring; and
   (g) wherein each of the passages is positioned tangential to the curvature of the rotor.

5. A ventilated brake rotor, comprising:
   (a) a hub mounting face;
   (b) a rotor ring having a first and second face;
   (c) a hub wall connecting the hub mounting face to the rotor ring;
   (d) wherein the rotor ring has passages for air having first and second openings;
   (e) wherein each passage passes from the first to the second face of said rotor ring;
   (f) wherein the passages are disposed at an angle less than 90 degrees to the face of said rotor ring; and
   (g) wherein each passage has a conical shape.

* * * * *